(12) United States Patent
Lee et al.

(10) Patent No.: US 11,207,940 B2
(45) Date of Patent: Dec. 28, 2021

(54) INTEGRATED THERMAL MANAGEMENT SYSTEM FOR VEHICLE

(71) Applicants: Hyundai Motor Company, Seoul (KR); Kia Motors Corporation, Seoul (KR)

(72) Inventors: Sang Shin Lee, Suwon-Si (KR); Man Ju Oh, Yongin-Si (KR); So La Chung, Seoul (KR); Jae Woong Kim, Hwaseong-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/859,820

(22) Filed: Apr. 27, 2020

(65) Prior Publication Data

US 2021/0146749 A1    May 20, 2021

(30) Foreign Application Priority Data

Nov. 19, 2019    (KR) .......................... 10-2019-0148154

(51) Int. Cl.
  *B60H 1/32*    (2006.01)
  *B60H 1/00*    (2006.01)

(52) U.S. Cl.
  CPC ..... *B60H 1/00278* (2013.01); *B60H 1/00885* (2013.01); *B60H 1/3228* (2019.05); *B60H 2001/00928* (2013.01); *B60H 2001/00949* (2013.01)

(58) Field of Classification Search
  CPC ............. B60H 1/00278; B60H 1/3228; B60H 1/00885; B60H 2001/00928; B60H 2001/00949

USPC .......................................................... 62/239
See application file for complete search history.

(56) References Cited

U.S. PATENT DOCUMENTS

| 2013/0053194 A1* | 2/2013 | Yokoyama | F16G 13/06 474/91 |
| 2013/0056194 A1* | 3/2013 | Cregut | F01P 7/164 165/300 |
| 2020/0101816 A1 | 4/2020 | Takagi | |
| 2020/0269724 A1 | 8/2020 | Takazawa et al. | |

(Continued)

FOREIGN PATENT DOCUMENTS

KR    10-1448656 B1    10/2014

*Primary Examiner* — Davis D Hwu
(74) *Attorney, Agent, or Firm* — Morgan, Lewis & Bockius LLP (57) ABSTRACT

An integrated thermal management system may include a battery line connected to a high-voltage battery, having a first radiator, and having cooling water flowing by a first pump; an internal heating line connected to an internal air-conditioning heating core, having a cooling water heater therein, having cooling water flowing by a second pump, and having a first valve at a downstream side of the heating core; a first battery heating line formed to be diverged from the internal heating line at a downstream side of the internal air-conditioning heating core and connected to the battery line at an upstream side of the high-voltage battery; a second battery heating line diverged heating line formed to be diverged from the battery line at a downstream side of the high-voltage battery and connected to the internal heating line; and a controller operating the first pump and the second pump.

14 Claims, 4 Drawing Sheets

(56) References Cited

U.S. PATENT DOCUMENTS

2020/0346523 A1* 11/2020 Oh .................... B60H 1/143
2020/0353796 A1* 11/2020 Oh .................... B60H 1/00485
2020/0391570 A1* 12/2020 Lee ................... B60H 1/00278

* cited by examiner

INTEGRATED THERMAL MANAGEMENT SYSTEM FOR VEHICLE

CROSS REFERENCE TO RELATED APPLICATION

The present application claims priority to Korean Patent Application No. 10-2019-0148154, filed Nov. 19, 2019, the entire contents of which is incorporated herein for all purposes by this reference.

BACKGROUND OF THE INVENTION

Field of the Invention

The present invention relates to an integrated thermal management system for a vehicle, the system efficiently managing energy required for internal air-conditioning, cooling of electronic devices, or cooling/heating of a battery in the automotive thermal management field.

Description of Related Art

Recently, implementation of an eco-friendly technology and solutions for problems such as energy exhaustion are rising as social issues associated with an electric vehicle. An electric vehicle is driven by a motor that outputs power by being supplied with electricity from a battery. Accordingly, an electric vehicle has advantages of not discharging carbon dioxide, generating little noise, and having a higher energy efficiency of a motor than the energy efficiency of an engine, so it has been spotlighted as an eco-friendly vehicle.

The core technology for achieving such an electric vehicle is the technology related to a battery module, and recently, studies for reducing the weight and size of a battery and decreasing the charge time have been actively conducted. A battery module can maintain optimal performance and a long lifespan when it is used in an optimal temperature environment. However, it is substantially difficult to use a battery module in an optimal temperature environment due to heat which is generated in operation and a change of external temperature.

Furthermore, an electric vehicle has no waste heat source which is generated by combustion in a specific engine such as an internal combustion engine, so that the interior of the electric vehicle is heated with an electric heating device in wintertime. Furthermore, warming-up is required to improve the charge/discharge performance of a battery in an intense cold period, so a separate cooling water heating-type electric heater is used.

That is, a technology of operating a heating/cooling system for controlling the temperature of a battery module separately from a heating/cooling system for internal air-conditioning of a vehicle to maintain an optimal temperature environment for the battery module has been adopted. In other words, two independent heating/cooling systems are constructed, so one thereof is used for internal heating/cooling and the other one is used for controlling the temperature of a battery module.

However, the present operation method cannot efficiently manage energy, so that the traveling range is short, and long-distance driving is impossible. Furthermore, the traveling range decreases over 30% when cooling is performed in summer time and over 40% when heating is performed in wintertime, so that the problem with heating in wintertime, which was not a problem in an internal combustion engine, becomes severe. When a high-capacity PTC is mounted to solve the problem with heating in wintertime, there is a problem of reduction of the traveling range and excessive manufacturing cost and weight due to use of a heat pump.

Accordingly, technologies of easily installing the systems in a vehicle and reducing the weight and the manufacturing cost of a vehicle by effectively arranging and configuring them as an assembly have been developed.

However, according to the integrated thermal management system for a vehicle of the related art, cooling water heated by a cooling water heater is introduced into a heater core for internal air-conditioning to be used for internal air-conditioning and cooling water heated by a coolant heater is used when a high-voltage battery increases in temperature.

However, in the instant case, the temperature range of cooling water required for internal air-conditioning and the temperature range of cooling water required when a high-voltage battery increases in temperature are different, so there is a limit in that the performance for internal air-conditioning is limited when the high-voltage battery increases in temperature.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a technology that can appropriately control the temperature of cooling water such that internal heating through a heating core for internal air-conditioning and an increase in temperature of a high-voltage battery both satisfy performance.

According to various aspects of the present invention, there is provided an integrated thermal management system for a vehicle. The integrated thermal management system includes: a battery line connected to a high-voltage battery to be configured to exchange heat, having a first radiator, and having cooling water flowing by a first pump; an internal heating line connected to an internal air-conditioning heating core, having a cooling water heater therein, having cooling water flowing by a second pump, and having a first valve at a downstream side of the heating core; a first battery heating line formed to be diverged from the internal heating line at a downstream side of the internal air-conditioning heating core and connected to the battery line at an upstream side of the high-voltage battery; a second battery heating line formed to be diverged from the battery line at a downstream side of the high-voltage battery and connected to the internal heating line; and a controller simultaneously operating the first pump and the second pump so that the cooling water in the internal heating line joins in the battery line through the first battery heating line or the second battery heating line and is then introduced to the high-voltage battery.

The controller may be configured to control a rotation speed of the first pump and a rotation speed of the second pump on the basis of a requested temperature or a requested flow rate of the cooling water which is introduced into the high-voltage battery.

The controller may decrease a temperature of the cooling water which is introduced into the high-voltage battery by increasing the rotation speed of the first pump or decreasing the rotation speed of the second pump, or may increase the temperature of the cooling water which is introduced into the high-voltage battery by decreasing the rotation speed of the first pump or increasing the rotation speed of the second pump.

The integrated thermal management system may further include a first valve mounted at a diverging point from the internal heating line to the first battery heating line or a joining point of the second battery heating line to the internal heating line, and adjusting flow of cooling water, in which the controller may adjust a ratio of a flow rate of cooling water joining the battery line from the internal heating line and a flow rate of cooling water bypassing the high-voltage battery and flowing to the internal heating line by controlling the first valve.

The controller may increase the temperature of the cooling water which is introduced into the high-voltage battery by controlling the first valve such that the ratio of the flow rate of the cooling water joining the battery line from the internal heating line increases, or may decrease the temperature of the cooling water which is introduced into the high-voltage battery by controlling the first valve such that the ratio of the flow rate of the cooling water bypassing the high-voltage battery and flowing to the internal heating line increases.

The integrated thermal management system may further include: a refrigerant line having an internal air-conditioning cooling core and a compressor and having a water-cooling condenser connected to an air-cooling condenser, which are exposed to external air to be configured to exchange heat with the external air, or the internal heating line to be configured to exchange heat; a bypass line formed to be diverged from the battery line, bypassing the first radiator, and joining the battery line at an upstream side of the first pump; and a chiller to which the bypass line and the refrigerant line are connected to be configured to exchange heat.

The integrated thermal management system may further include a second valve mounted at a point diverging from the battery line to the bypass line or a point where the bypass line joins the battery line, and adjusting the flow of cooling water, in which the controller may adjust a ratio of a flow rate of cooling water flowing to the first radiator and a flow rate of cooling water flowing to the bypass line by controlling the second valve.

The controller may decrease the temperature of the cooling water which is introduced into the high-voltage battery by controlling the second valve such that the ratio of the flow rate of the cooling water flowing to the first radiator increases, or may decrease the temperature of the cooling water which is introduced into the high-voltage battery by controlling the second valve such that the ratio of the flow rate of the cooling water flowing to the bypass line increases.

The integrated thermal management system may further include an electronic device line connected to an electronic device to be configured to exchange heat, having a second radiator, and having cooling water flowing therein by a third pump, in which the electronic device line may be separated from the bypass line and connected to the refrigerant line to be configured to exchange heat at the chiller.

The chiller and the internal air-conditioning cooling core of the refrigerant line may be connected in parallel to each other, a first expansion valve may be mounted at an upstream side of the chiller, a second expansion valve may be mounted at an upstream side of the internal air-conditioning cooling core, and the controller may be configured to control the amount of cooling of the refrigerant line at the chiller by controlling opening/closing of the first expansion valve, opening/closing of the second expansion valve, or operation of the compressor.

According to the integrated thermal management system for a vehicle of the present invention, there is an effect that it is possible to maintain the performance of an internal air-conditioning heater against an increase in temperature of a high-voltage battery.

Furthermore, there is an effect that a thermal management efficiency is improved by integrating thermal management of a high-voltage battery, an electronic device, and internal air-conditioning which may be maintained in different temperature ranges.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In the following description, the structural or functional description specified to exemplary embodiments according to the concept of the present invention is directed to describe the exemplary embodiments of the present invention, so it may be understood that the present invention may be variously embodied, without being limited to the exemplary embodiments.

Embodiments described herein may be changed in various ways and various shapes, so specific embodiments are shown in the drawings and will be described in detail in the exemplary embodiment of the present invention. However, it may be understood that the exemplary embodiments according to the concept of the present invention are not limited to the exemplary embodiments which will be described hereinbelow with reference to the accompanying drawings, but all of modifications, equivalents, and substitutions are included in the scope and spirit of the present invention.

It will be understood that, although the terms first and/or second, etc. may be used herein to describe various elements, these elements may not be limited by these terms. These terms are only used to distinguish one element, from another element. For instance, a first element discussed below could be termed a second element without departing from the teachings of the present invention. Similarly, the second element could also be termed the first element.

It is to be understood that when one element is referred to as being "connected to" or "coupled to" another element, it may be directly connected to or directly coupled to another element or be connected to or coupled to another element, having the other element intervening therebetween. On the other hand, it is to be understood that when one element is referred to as being "directly connected to" or "directly coupled to" another element, it may be connected to or coupled to another element without the other element intervening therebetween. Furthermore, the terms used herein to describe a relationship between elements, that is, "between", "directly between", "adjacent" or "directly adjacent" may be interpreted in the same manner as those described above.

The terminology used herein is for describing various exemplary embodiments only and is not intended to limit the present invention Singular forms are intended to include plural forms unless the context clearly indicates otherwise. It will be further understood that the terms "includes" or "have" used in the exemplary embodiment, specify the presence of stated features, numerals, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which an exemplary embodiment of the present invention belongs. It may be understood that the terms defined by the dictionary are identical with the meanings within the context of the related art, and they may not be ideally or excessively formally defined unless the context clearly dictates otherwise.

The present invention will be described hereafter in detail by describing exemplary embodiments of the present invention with reference to the accompanying drawings. Like reference numerals provided in the drawings indicate like components.

Figure 1:
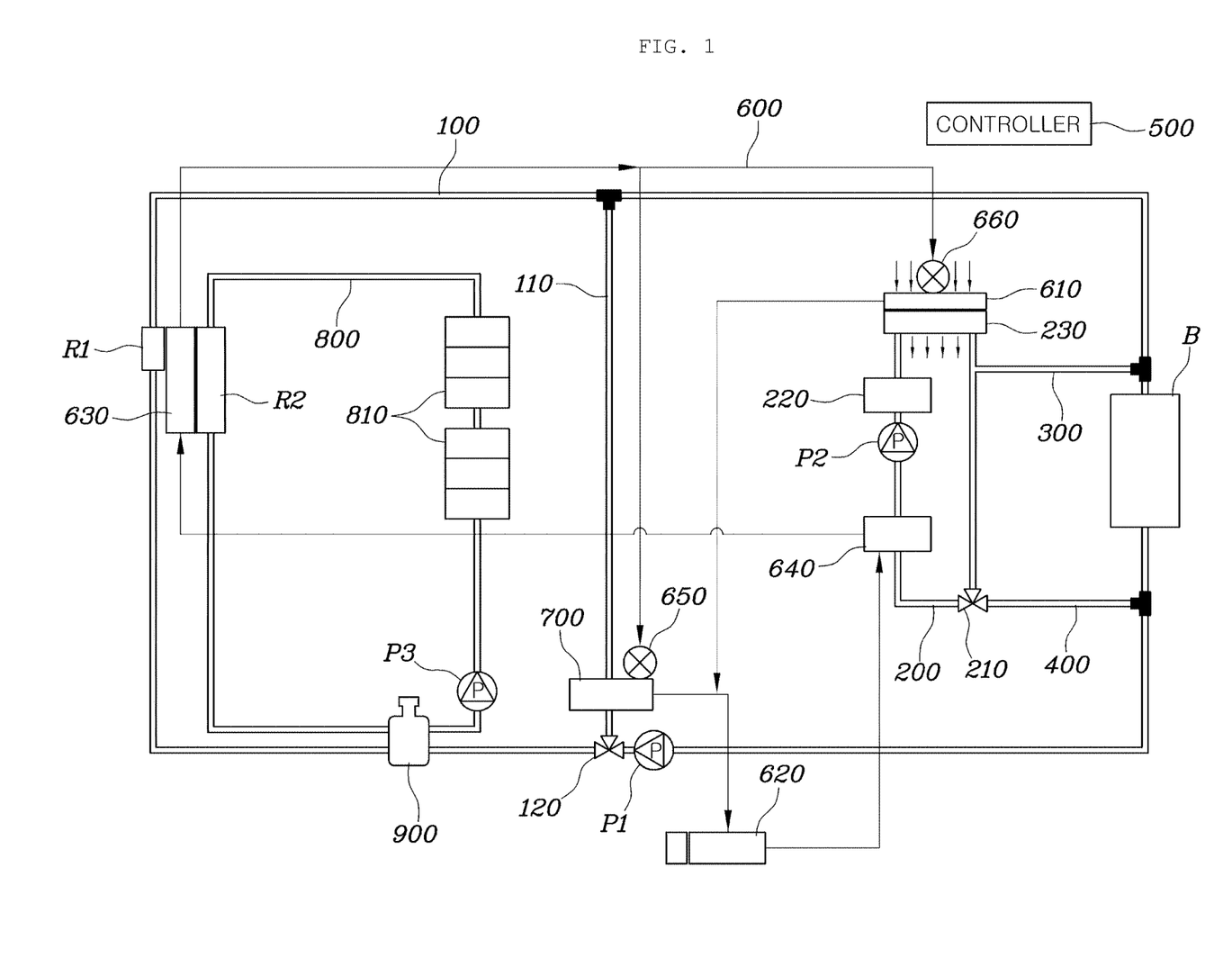
FIG. 1 is a diagram showing the configuration of an integrated thermal management system for a vehicle according to an exemplary embodiment of the present invention.

FIG. 1 is a diagram showing the configuration of an integrated thermal management system for a vehicle according to an exemplary embodiment of the present invention.

Referring to FIG. 1, an integrated thermal management system for a vehicle according to an exemplary embodiment of the present invention includes: a battery line 100 connected to a high-voltage battery B to be configured to exchange heat, having a first radiator R1, and having cooling water flowing by a first pump P1; an internal heating line 200 connected to an internal air-conditioning heating core 230, having a cooling water heater 220 therein, having cooling water flowing by a second pump P2, and having a first valve 210 at a downstream side of the heating core 230; a first battery heating line 300 diverging from the internal heating line 200 at a downstream side of the heating core 230 and connected to the battery line 100 at an upstream side of the high-voltage battery B; a second battery heating line 400 diverging from the battery line 100 at a downstream side of the high-voltage battery B and connected to the internal heating line 200; and a controller 500 simultaneously operating the first pump P1 and the second pump P2 so that the cooling water in the internal heating line 200 joins the cooling water in the battery line 100 through the first battery heating line or the second battery heating line and is then introduced to the high-voltage battery B.

Cooling water can flow through the battery line 100 by the first pump P1 and the cooling water therein may be connected to the high-voltage battery B to be configured to exchange heat. The cooling water in the battery line 100 may be connected to the external air through a first radiator R1 to be configured to exchange heat.

The internal air-conditioning heating core 230 is mounted in the internal heating line 200 and cooling water that flows by the second pump P2 can circulate therein. The cooling water heater 220 is mounted at an upstream side of the internal air-conditioning heating core 230, being able to heat cooling water therein.

The first battery heating line 300 and the second battery heating line 400 can connect the internal heating line 200 and the battery line 100. In detail, the first battery heating line 300 and the second battery heating line 400 may diverge from an upstream side and a downstream side of the high-voltage battery B, respectively, and then may be connected to the internal heating line 200 at a downstream side of the battery line 100 and the heating core 230.

The first battery heating line 300 may be connected to an upstream side further than the second battery heating line 400, and when the second pump P2 is operated, cooling water diverges to the battery line 100 through the first battery heating line 300 from the internal heating line 200 and cooling water, which has passed through the high-voltage battery B, in the battery line 100 may join the internal heating line 200 through the second battery heating line 400.

A controller 500 according to exemplary embodiments of the present invention may be implemented through a non-volatile memory configured to store algorithms for controlling operation of various components of a vehicle or data about software commands for executing the algorithms, and a processor configured to perform operation to be described below using the data stored in the memory. The memory and the processor may be individual chips. Alternatively, the memory and the processor may be integrated in a single chip. The processor may be implemented as one or more processors.

The controller 500 simultaneously operates the first pump P1 and the second pump P2, whereby the cooling water in the internal heating line 200 and the cooling water in the battery line 100 may be mixed through the first battery heating line 300 and the second battery heating line 400.

When only the first pump P1 is operated, the cooling water in the battery line 100 can circulate in the battery line 100. Accordingly, it is possible to cool the high-voltage battery line B.

When only the second pump P2 is operated, the cooling water in the internal heating line 200 may be circulated to be introduced into the high-voltage battery B through the first battery heating line 300 and the introduced back into the internal heating line 200 through the second battery heating line 400. Accordingly, it is possible to increase the temperature of the high-voltage battery line B. When the temperature of the high-voltage battery B is increased, about 40~50 is preferable.

To heat an internal through the internal air-conditioning heating core 230, the temperature of the cooling water in the internal heating line 200 which is introduced to the heating coil 230 may be about 70, and the temperature of the cooling water that has passed through the heating core 230 is about 60, which is a high temperature to increase the temperature of the high-voltage battery B.

Therefore, according to the related art, the temperature of the cooling water in the internal heating line 200 was dropped to maintain the temperature of the cooling water which is introduced into the high-voltage battery B at an appropriate level, but there was a problem that the internal heating performance was deteriorated.

According to an exemplary embodiment of the present invention, to solve the present problem, the first pump P1 and the second pump P2 may be both operated so that the cooling water in the battery line 100 and the cooling water in the internal heating line 200 may be introduced into the high-voltage battery B after they are mixed.

A reserve tank 900 store the cooling water both in the battery line 100 and in electronic device line 800. The interior of the reserve tank 900 is separated from each other so that the cooling water in the battery line 100 and the cooling water in the electronic device line are not mixed with each other.

Figure 2:
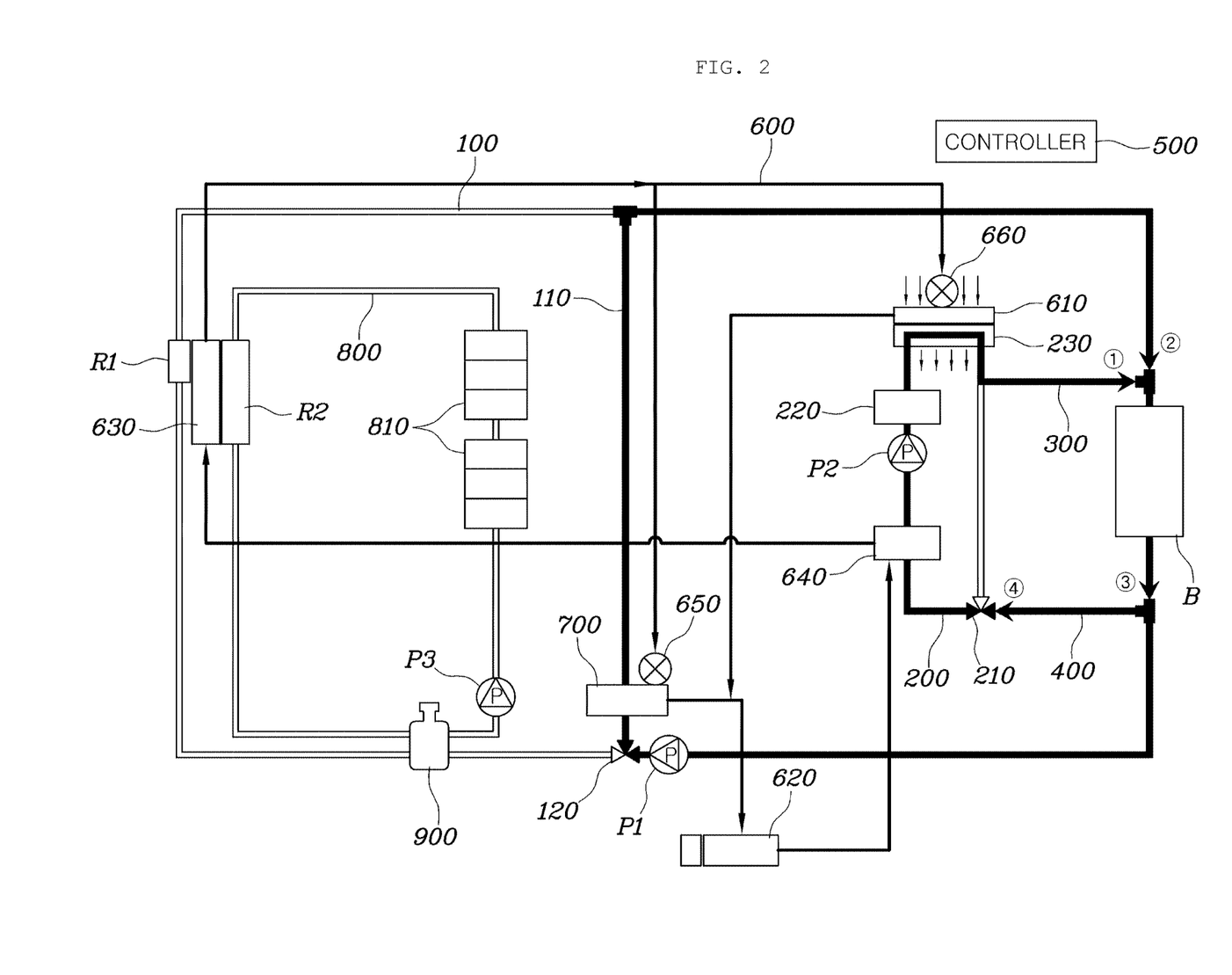
FIG. 2, FIG. 3 and FIG. 4 are diagrams showing the flow of cooling water in an integrated thermal management system for a vehicle according to various embodiments of the present invention.
Figure 3:
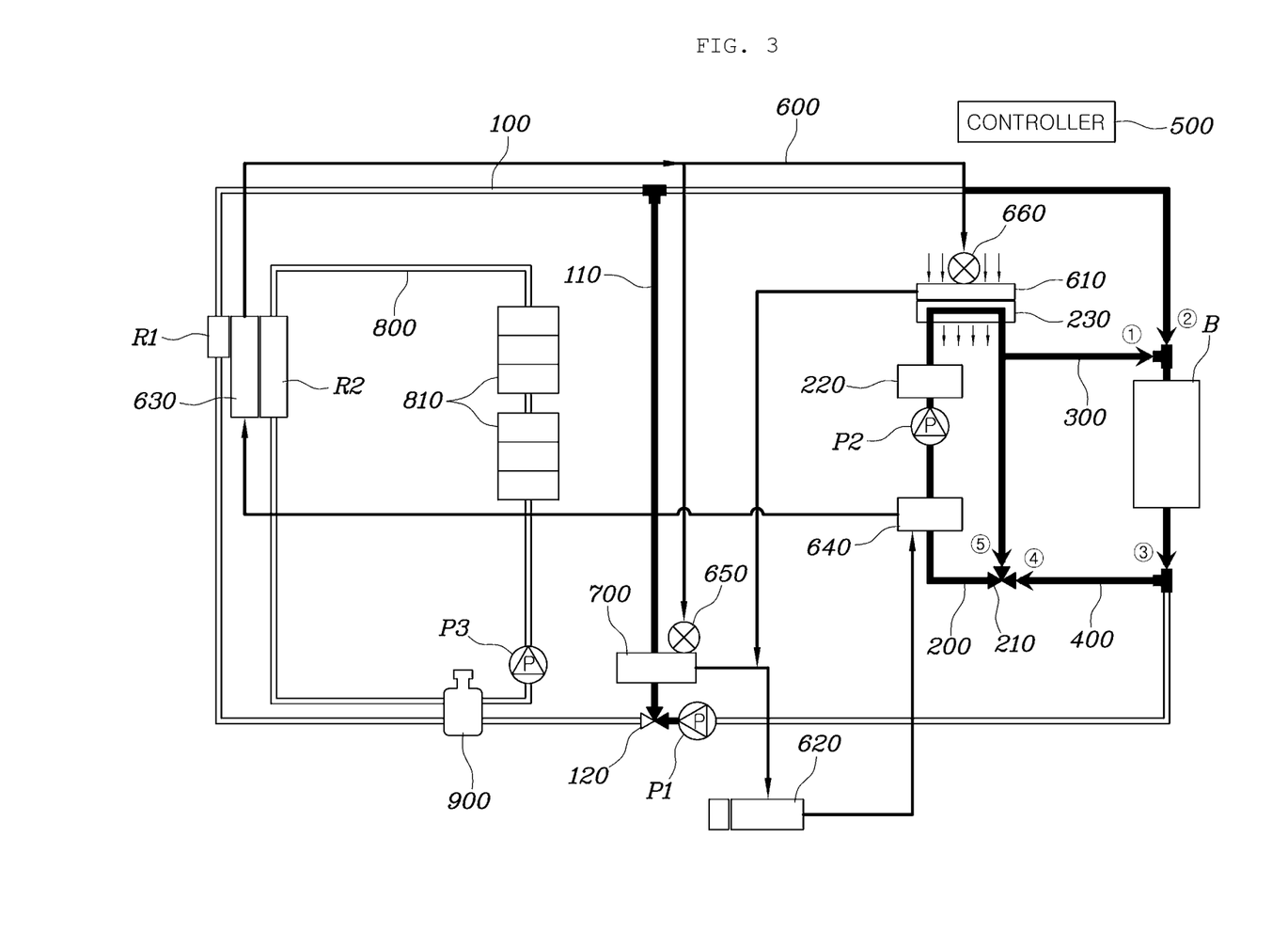
Figure 4:
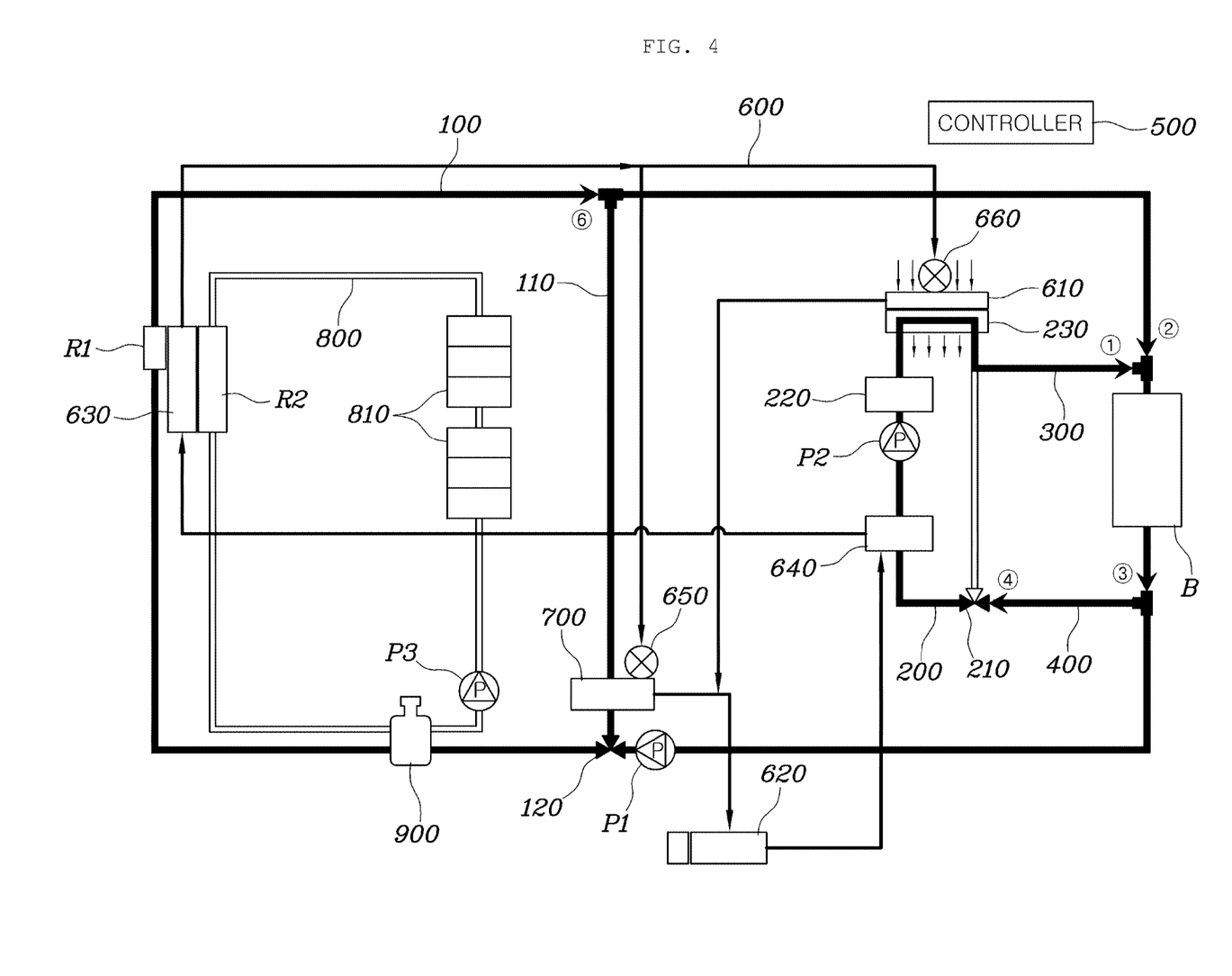

FIG. 2, FIG. 3 and FIG. 4 are diagrams showing the flow of cooling water in an integrated thermal management system for a vehicle according to various embodiments of the present invention.

Referring to FIG. 2, the controller 500 can control the rotation speed of the first pump P1 and the rotation speed of the second pump P2 on the basis of the requested temperature or the requested flow rate of the cooling water which is introduced into the high-voltage battery B.

The controller 500 can control the rotation speed of the first pump P1 and the rotation speed of the second pump P2 such that the temperature of the cooling water ③ which is introduced into the high-voltage battery B matches the requested temperature.

The temperature Temp3 of the cooling water ③ which is introduced into the high-voltage battery B may be determined as follows on the basis of an outlet temperature Temp1 of the heating core 230, a coolant ratio ① of the internal heating line 200, the temperature Temp2 of the cooling water in the battery line 100 which is introduced to an upstream side of the battery line 100, and a coolant ratio ② of the battery line 100.

$$Temp_3 = \text{coolant ratio of } ① \times Temp_1 + \text{coolant ratio of } ② \times Temp_2$$

As an exemplary embodiment of the present invention, the controller 500 can decrease the temperature of the cooling water ③ which is introduced into the high-voltage battery B by decreasing the coolant ratio ① of the internal heating line 200 by increasing the rotation speed of the first pump P1 or decreasing the rotation speed of the second pump P2.

Alternatively, the controller 500 can increase the temperature of the cooling water ③ which is introduced into the high-voltage battery B by increasing the coolant ratio ① of the internal heating line 200 by decreasing the rotation speed of the first pump P1 or increasing the rotation speed of the second pump P2.

Furthermore, the controller 500 can control the rotation speed of the first pump P1 and the rotation speed of the second pump P2 such that the flow rate of the cooling water ③ which is introduced into the high-voltage battery B follows the requested flow rate. In more detail, it is possible to control the flow rate of the cooling water by simultaneously increasing or decreasing the rotation speed of the first pump P1 and the rotation speed of the second pump P2. That is, it is possible to increase or decrease the rotation speed of the first pump P1 and the rotation speed of the second pump P2 with the coolant ratio ① of the internal heating line 200 and the coolant ratio ② of the battery line 100 fixed.

The cooling water ④ in the battery line 100 discharged from the high-voltage battery B, as described below, may be introduced back into the battery line 100 at an upstream side of the high-voltage battery B after passing through a chiller 700 or the first radiator R1. The temperature Temp4 of the cooling water ④ in the battery line 100 discharged from the high-voltage battery B may be the same as the temperature Temp2 of the cooling in the battery line 100 which is introduced from an upstream side of the high-voltage battery B, but as described above, may be changed, depending on whether heat has been exchanged through the chiller 700 or the coolant ratio flowing to the first radiator R1.

Referring to FIG. 3, the system may further include a first valve 210 mounted at a diverging point from the internal heating line 200 to the first battery heating line 300 or a joining point of the second battery heating line 400 to the internal heating line 200, and adjust the flow of cooling water.

The first valve 210 is a three-way valve, is mounted at the point diverging from or joining the internal heating line 200, and can adjust the coolant ratio between the cooling water ① diverging from the internal heating line 200 to the first battery heating line 300 and the cooling water ⑤ bypassing the high-voltage battery B and flowing through the internal heating line 200.

Alternatively, the first valve 210 may be mounted at a point joining the internal heating line 200 from the battery line 100 through the second battery heating line 400.

The controller 500 can adjust the ratio of the flow rate of the cooling water ① joining the battery line 100 from the internal heating line 200 and the flow rate of the cooling water ⑤ bypassing the high-voltage battery B and flowing to the internal heating line 200 by controlling the first valve 210.

In more detail, the controller 500 can increase the temperature of the cooling water which is introduced into the high-voltage battery B by controlling the first valve 210 such that the ratio of the flow rate of the cooling water ① joining the battery line 100 from the internal heating line 200 increases.

Alternatively, the controller 500 can decrease the temperature of the cooling water which is introduced into the high-voltage battery B by controlling the first valve 210 such that the ratio of the flow rate of the cooling water ① bypassing the high-voltage battery B and flowing to the internal heating line 200 increases.

That is, the controller 500 can control the temperature of the cooling water which is introduced into the high-voltage battery B and adjust the amount of heat which is provided from the internal heating line 200 to the high-voltage battery B by adjusting the ratio between the cooling water flowing to the high-voltage battery B and the cooling water ⑤ bypassing the high-voltage battery B by controlling the first valve 210.

Referring to FIG. 1 again, the system may further include: a refrigerant line 600 having an internal air-conditioning cooling core 610 and a compressor 620 and having a water-cooling condenser 640 connected to an air-cooling condenser 630, which are exposed to external air to be configured to exchange heat with the external air, or the internal heating line 200 to be configured to exchange heat; a bypass line 110 diverging from the battery line 100, bypassing the first radiator R1, and joining the battery line 100 at an upstream side of the first pump P1; and a chiller 700 to which the bypass line 110 and the refrigerant line 600 are connected to be configured to exchange heat.

The inside of the refrigerant line 600 is cooled by the internal air-conditioning cooling core 610 and the refrigerant line 600 can cool the cooling water in the battery line 100 using the chiller 700. A refrigerant compressed by the compressor 620 in the refrigerant line 600 may be cooled by the air-cooling condenser 630 or the water-cooling condenser 640. The water-cooling condenser 640 is mounted at an upstream side of the coolant heater 220 in the internal heating line 200 and can exchange heat with the cooling water in the internal heating line 200.

The bypass line 110 bypassing the first radiator R1 is connected to the battery line 100 and the cooling water in the battery line 100 can exchange heat with the cooling line 600 through the chiller 700 in the bypass line 110.

The system may further include a second valve 120 mounted at a point diverging from the battery line 100 to the bypass line 110 or a point where the bypass line 110 joins the battery line 100, and adjusting the flow of cooling water.

The second valve 120 may be a three-way valve and is mounted at the point diverging from the battery line 100 to the bypass line 110 or the point where the bypass line 110 joins the battery line 100, being able to adjust the ratio between the flow rate of the cooling water ⑥ flowing to the first radiator R1 and the flow rate of the cooling water ②-⑥ flowing to the bypass line 110.

The controller 500 can adjust the ratio of the flow rate of the cooling water ⑥ flowing to the first radiator R1 and the flow rate of the cooling water ②-⑥ flowing to the bypass line 110 by controlling the second valve 120.

The controller 500, as shown in FIG. 2, can control the second valve 120 to block the cooling water flowing to the first radiator R1 and allow only the cooling water flowing to the bypass line 110 to be introduced into the high-voltage battery B.

As another exemplary embodiment of the present invention, the controller 500, as shown in FIG. 4, can control the second valve 120 such that cooling water flows to the first radiator R1.

In detail, the controller 500 can decrease the temperature of the cooling water which is introduced into the high-voltage battery B by controlling the second valve 120 such that the ratio of the flow rate of the cooling water ⑥ flowing to the first radiator R1 increases, or can decrease the temperature of the cooling water which is introduced into the high-voltage battery B by controlling the second valve 120 such that the ratio of the flow rate of the cooling water ②-⑥ flowing to the bypass line 110 increases.

The system may further include an electronic device line 800 connected to an electronic device 810 to be configured to exchange heat, having a second radiator R2, and having cooling water flowing therein by a third pump P3. The electronic device line 800 may be separated from the bypass line 110 and connected to the refrigerant line 600 to be configured to exchange heat at the chiller 700.

The electronic device line 800 may be configured separately from the battery line 100 because it is managed in a temperature range different from that of the high-voltage battery B, and can exchange heat with the refrigerant line 600 at the chiller 700 similar to the bypass line 110 diverging from the battery line 100. Accordingly, the chiller 700 can restore the waste heat of the cooling water heated by the high-voltage battery B or the electronic device 810 through the refrigerant line 600.

The chiller 700 and the internal air-conditioning cooling core 610 of the refrigerant line 600 may be connected in parallel to each other, a first expansion valve may be mounted at an upstream side of the chiller 700, and a second expansion valve 660 may be mounted at an upstream side of the internal air-conditioning cooling core 610.

The first expansion valve 650 connected to the refrigerant line 600 is mounted at an upstream side of the chiller 700 and can control the flow rate of a refrigerant flowing to the chiller 700 and the second expansion valve 660 is mounted at an upstream side of the internal air-conditioning cooling core 610 and can control the flow rate of the refrigerant flowing to the internal air-conditioning cooling core 610.

The controller 500 can control the amount of cooling of the refrigerant line 600 at the chiller 700 by controlling opening/closing of the first expansion valve 650, opening/closing of the second expansion valve 660, or the operation of the compressor 620. That is, the controller 500 can control the flow rate of the refrigerant flowing to the chiller 700 by controlling opening/closing of the first expansion valve 650, opening/closing of the second expansion valve 660, or the operation of the compressor 620, and accordingly, the controller 500 can adjust the temperature of the cooling water in the battery line 100 by adjusting the amount of cooling of the cooling water flowing to the bypass line 110.

That is, the controller 500 can control the temperature of cooling water which is introduced into the high-voltage battery line B by controlling opening/closing of the first expansion valve 650, opening/closing of the second expansion valve 660, or the operation of the compressor 620.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An integrated thermal management system for a vehicle, the system comprising:

a battery line connected to a battery to exchange heat, wherein a first radiator and a first pump flowing a cooling water are mounted in the battery line;

an internal heating line connected to an internal air-conditioning heating core, wherein a cooling water heater, a second pump flowing the cooling water, and a first valve are mounted in the internal heating line and wherein the first valve is mounted at a downstream side of the internal air-conditioning heating core;

a first battery heating line formed to be diverged from the internal heating line at a downstream side of the internal air-conditioning heating core and connected to the battery line at an upstream side of the battery;

a second battery heating line formed to be diverged from the battery line at a downstream side of the battery and connected to the internal heating line; and a controller connected to the first pump and the second pump and configured of operating the first pump and the second pump so that the cooling water in the internal heating line joins in the battery line through the first battery heating line or the second battery heating line and is then introduced to the battery;

a refrigerant line connected to an internal air-conditioning cooling core, a compressor, and a water-cooling condenser connected to an air-cooling condenser, which are exposed to external air to exchange heat with the external air, or the internal heating line to exchange heat;

a bypass line formed to be diverged from the battery line, bypassing the first radiator, and joining the battery line at an upstream side of the first pump; and a chiller to which the bypass line and the refrigerant line are connected to be configured to exchange heat.

2. The integrated thermal management system of claim 1, wherein the controller is configured to control a rotation speed of the first pump and a rotation speed of the second pump on a basis of a predetermined temperature or a predetermined flow rate of the cooling water which is introduced into the battery.

3. The integrated thermal management system of claim 2, wherein the controller is configured to decrease a temperature of the cooling water which is introduced into the battery by increasing the rotation speed of the first pump.

4. The integrated thermal management system of claim 2, wherein the controller is configured to increase a temperature of the cooling water which is introduced into the battery by decreasing the rotation speed of the first pump or increasing the rotation speed of the second pump.

5. The integrated thermal management system of claim 1, further including:
a first valve connected to the controller and mounted at a diverging point from the internal heating line to the first battery heating line or a joining point of the second battery heating line to the internal heating line, and configured of adjusting flow of the cooling water,
wherein the controller is configured to adjust a ratio of a flow rate of cooling water joining the battery line from the internal heating line and a flow rate of cooling water bypassing the battery and flowing to the internal heating line by controlling the first valve.

6. The integrated thermal management system of claim 5, wherein the controller is configured to increase a temperature of the cooling water which is introduced into the battery by controlling the first valve so that the ratio of the flow rate of the cooling water joining the battery line from the internal heating line increases.

7. The integrated thermal management system of claim 5, wherein the controller is configured to decreases a temperature of the cooling water which is introduced into the battery by controlling the first valve so that the ratio of the flow rate of the cooling water bypassing the battery and flowing to the internal heating line increases.

8. The integrated thermal management system of claim 1, wherein the internal air-conditioning cooling core and the internal air-conditioning heating core are positioned to face each other to heat-exchange therebetween.

9. The integrated thermal management system of claim 1, further including:
a second valve connected to the controller and mounted at a point diverging from the battery line to the bypass line or a point where the bypass line joins the battery line, and configured of adjusting the flow of the cooling water,
wherein the controller is configured to adjust a ratio of a flow rate of cooling water flowing to the first radiator and a flow rate of cooling water flowing to the bypass line by controlling the second valve.

10. The integrated thermal management system of claim 9, wherein the controller is configured to decrease a temperature of the cooling water which is introduced into the battery by controlling the second valve so that the ratio of the flow rate of the cooling water flowing to the first radiator increases, or to decrease the temperature of the cooling water which is introduced into the battery by controlling the second valve so that the ratio of the flow rate of the cooling water flowing to the bypass line increases.

11. The integrated thermal management system of claim 1, further including:
an electronic device line connected to an electronic device to exchange heat, a second radiator, and to a third pump flowing cooling water,
wherein the electronic device line is separated from the bypass line and connected to the refrigerant line to exchange heat at the chiller.

12. The integrated thermal management system of claim 11, wherein the first radiator connected to the battery line is positioned to face the air-cooling condenser which is positioned to face the second radiator connected to the electronic device line.

13. The integrated thermal management system of claim 1,
wherein the chiller and the internal air-conditioning cooling core of the refrigerant line are connected in parallel to each other, a first expansion valve connected to the refrigerant line is mounted at an upstream side of the chiller, and a second expansion valve connected to the refrigerant line is mounted at an upstream side of the internal air-conditioning cooling core, and
wherein the controller connected to the first expansion valve, the second expansion valve and the compressor is configured to control an amount of cooling of the refrigerant line at the chiller by controlling opening or closing of the first expansion valve, opening or closing of the second expansion valve, or operation of the compressor connected to the refrigerant line.

14. The integrated thermal management system of claim 11, wherein the chiller and the internal air-conditioning cooling core of the refrigerant line are connected in parallel to each other, a first expansion valve connected to the refrigerant line is mounted at an upstream side of the chiller, and a second expansion valve connected to the refrigerant line is mounted at an upstream side of the internal air-conditioning cooling core, and wherein the controller connected to the first expansion valve, the second expansion valve and the compressor is configured to control an amount of cooling of the refrigerant line at the chiller by controlling opening or closing of the first expansion valve, opening or closing of the second expansion valve, or operation of the compressor connected to the refrigerant line.

* * * * *